May 25, 1954

E. ISAKSEN 2,679,326

POWER SHOVEL

Filed Nov. 23, 1949

INVENTOR.
ELMER ISAKSEN
BY
*Rafhund Brown*
ATTORNEY

May 25, 1954

E. ISAKSEN 2,679,326

POWER SHOVEL

Filed Nov. 23, 1949

INVENTOR.
ELMER ISAKSEN
BY
*Rafhur Mron*
ATTORNEY

May 25, 1954 E. ISAKSEN 2,679,326
POWER SHOVEL

Filed Nov. 23, 1949 3 Sheets-Sheet 3

*INVENTOR.*
ELMER ISAKSEN
BY
ATTORNEY

Patented May 25, 1954

2,679,326

UNITED STATES PATENT OFFICE 2,679,326

POWER SHOVEL

Elmer Isaksen, Velva, N. Dak.

Application November 23, 1949, Serial No. 128,960

5 Claims. (Cl. 214—140)

This invention relates to power shovels of the tractor-borne type.

Shovels of this type ordinarily include a bucket carried by a forwardly projecting vertically swingable boom structure rockably mounted on a tractor and powered by the tractor engine. In carrying out a normal operation with such shovels, as heretofore constructed, repeated time-consuming maneuvers of the tractor are required. That is to say, after each advance of the tractor to effect a bucket-loading crowding action, the tractor must be backed away and turned into a dumping position, and thereafter again turned to return it into position for the next bucket-loading advance.

One object of the present invention is to provide a power shovel of the type mentioned in which the parts are so constructed and arranged as to avoid the repeated turning movements heretofore required.

Another object is to provide a side-dump bucket for shovels of this type.

Other more specific objects and advantages will appear, expressed or implied, from the following description of a power shovel embodying this invention.

In the accompanying drawings—

Figure 1:
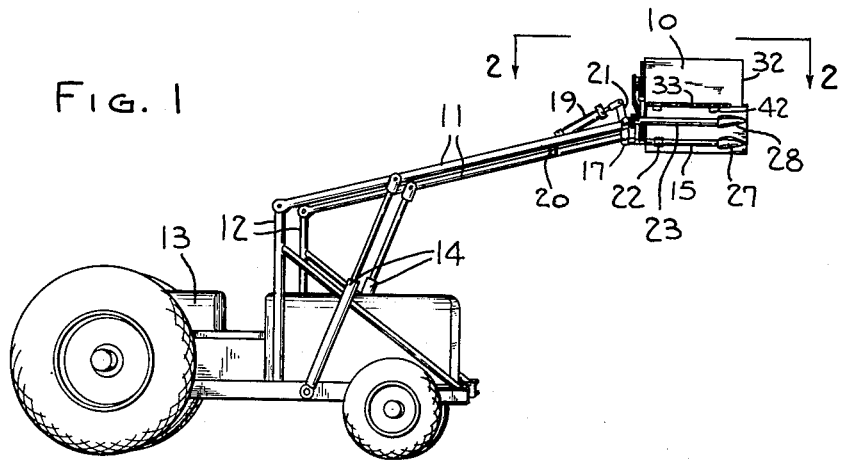
Figure 1 is a view in perspective of a tractor-borne power shovel constructed in accordance with the present invention.
Figure 2:
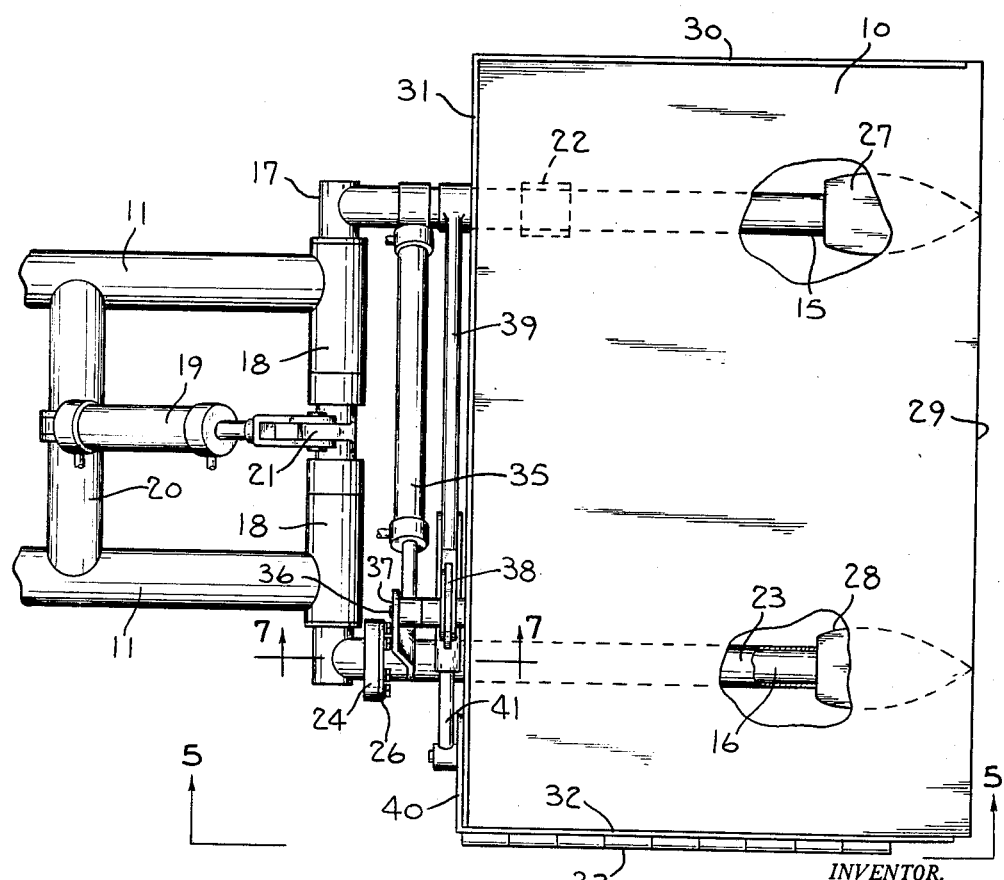
Fig. 2 is a top plan view, on a larger scale, of the bucket shown in Fig. 1.

The power shovel selected for illustration comprises a material receiving member in the form of a bucket 10 carried by the forward end of a vertically swingable boom structure 11 rockably mounted on a pair of appropriate rigid frames 12 carried by a conventional tractor 13. The boom 11 is supported and actuated by a pair of hydraulic jacks 14 in a conventional manner.

Figure 6:
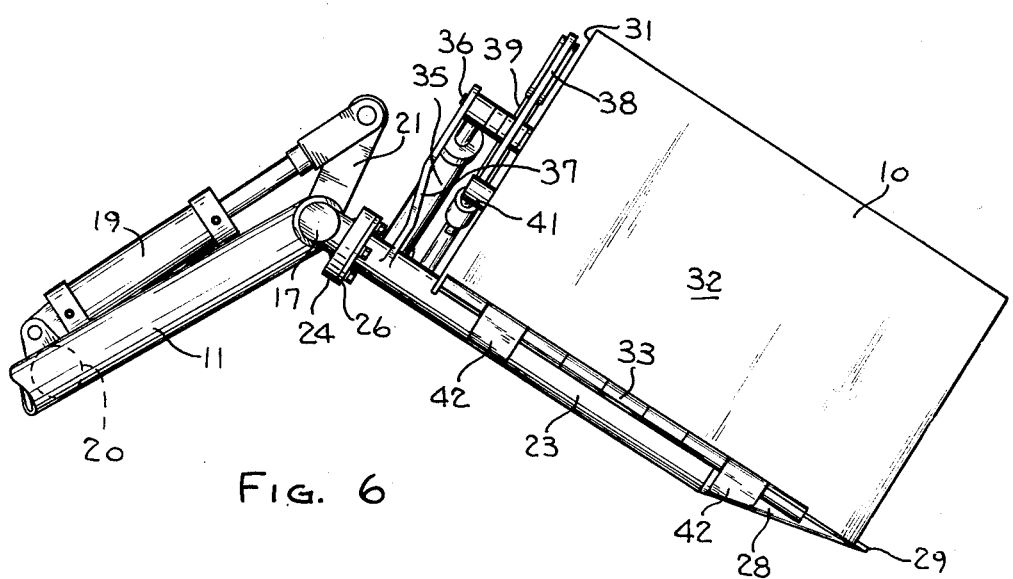
Fig. 6 is a view similar to Fig. 5 showing the bucket in forward dumping position.
Figure 7:
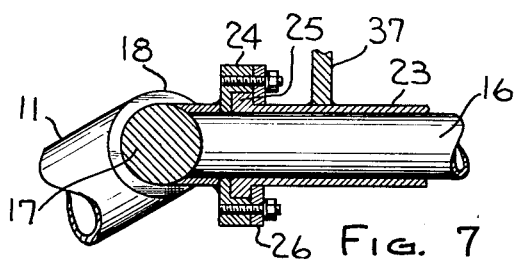
Fig. 7 is a detail sectional view taken along the line 7—7 of Fig. 2.

The bucket 10 is shown supported on a pair of parallel, round, laterally spaced bars 15 and 16 rigidly joined to the opposite ends, respectively, of a horizontal rock shaft 17. The shaft 17 extends transversely of the boom 11 and is journalled in suitable aligned bearing members 18 fixed to the forward end of the boom. The rotative position of the shaft 17 is controlled by appropriate mechanism, such as a hydraulic jack 19 rockably connected at one end to a cross member 20 on the boom 11 and at the other end to a crank arm 21 carried by the shaft. The bars 15 and 16 and shaft 17 thus provide a bucket carrier angularly adjustable relative to the boom, so as to permit the bucket 10 to maintain a substantially level position throughout the range of operation of the boom or to tilt forwardly into a dumping position such as indicated in Fig. 6.

In this instance the bucket 10 is also tiltable laterally so as to permit side dumping of the contents thereof. For this purpose the bucket is arranged to normally rest by gravity on the bar 15 and to be rockable about the axis of the other supporting bar 16. In the arrangement shown the bar 15 is normally engaged in an open saddle block 22 fixed to the bottom of the bucket, while the other bar 16 is rotatably fitted in a tubular member 23 fixed to the bucket bottom. The bar 16 is retained within the tubular member 23 by suitable means, such as a collar 24 fixed to the bar and recessed to receive a rib 25 on the inner end of the tubular member, the latter being retained within the collar 24 by a ring 26 attached to the latter.

The bucket 10 is preferably equipped with two thrust sustaining lugs 27 and 28 each disposed in abutting relation with the forward end of one of the bars 15 or 16. These lugs are shown attached to the bottom of the bucket beneath the leading edge 29 thereof so as to stiffen and reinforce the same. It will of course be understood that the lug 27 is separable from the bar 15 so as to lift away therefrom whenever the bucket is tilted about the bar 16, but the other lug 28 is preferably fixed to the forward end of the tubular member 23.

The bucket shown is provided with a stationary side wall 30 and rear wall 31, but the other side wall 32 is preferably hinged to the bottom of the bucket, as indicated at 33, so that that side of the bucket may be opened to facilitate discharge of material therefrom. Provision is preferably made for automatically swinging this side wall 32 into open position whenever the bucket is tilted into position for side dumping. Although this might be accomplished in various ways, mechanism which has proven satisfactory for the purpose will now be described.

In this instance a hydraulic jack 35 is provided for lifting one side of the bucket 10 away from the bar 15 and to thereby tilt the same about the bar 16 into side dumping position. The jack 35 is shown connected at one end to the bar 15 and at its other end to a pintle 36 that projects rearwardly from the rear wall 31 of the bucket. The rear end of the pintle 36 is supported by a crank arm 37 fixed to and projecting upwardly from the tubular member 23 hereinabove mentioned. The pintle 36 also provides support for a lever 33, one end of which is connected through a link 39 to the bar 15, the other end being connected to an end wing 40 of the side wall 32 through appropriate linkage 41.

Figure 3:
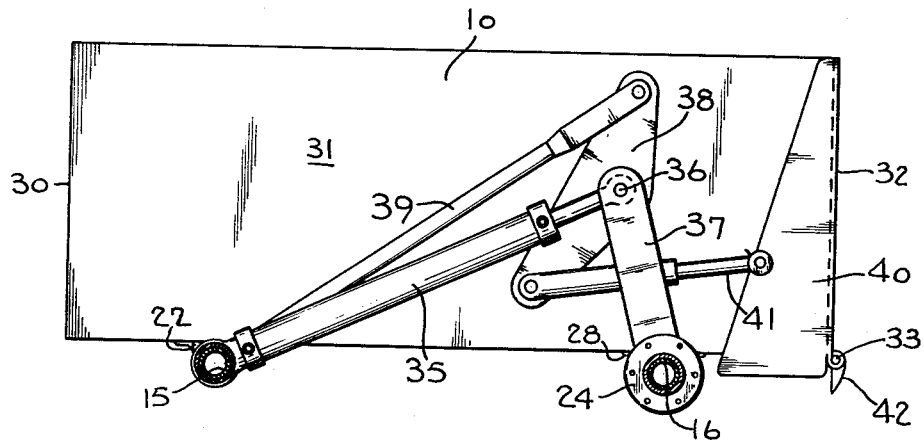
Fig. 3 is a sectional view taken along the line 3—3 of Fig. 5.
Figure 4:
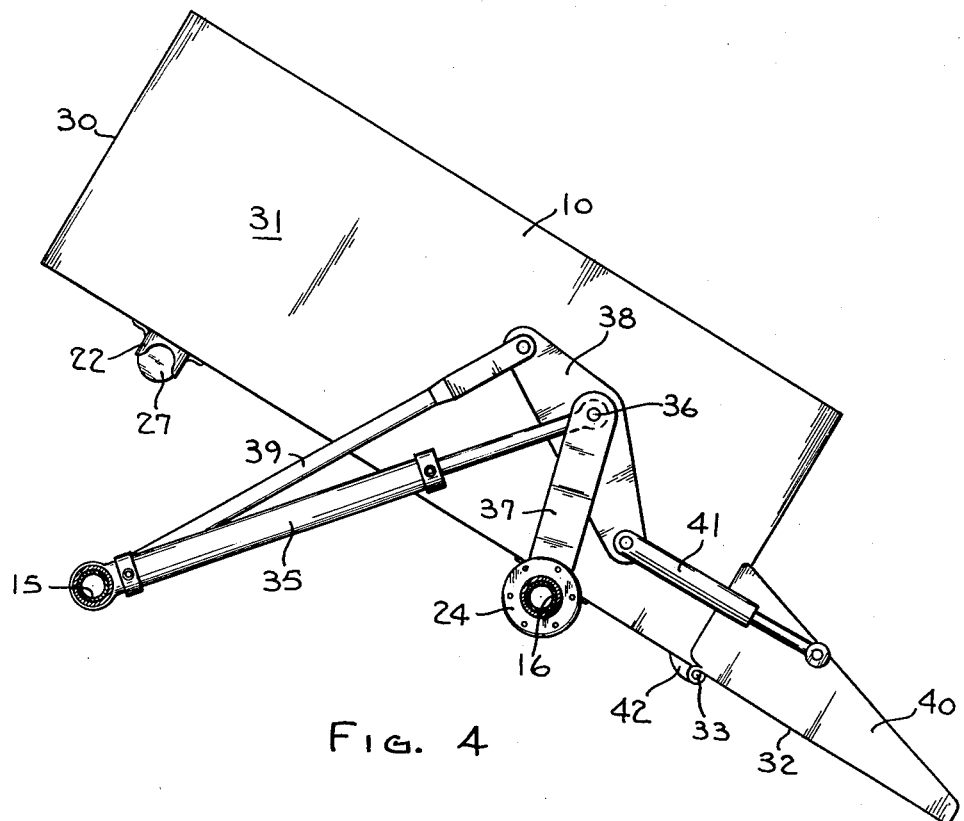
Fig. 4 is a view similar to Fig. 3 showing the bucket in side dumping position.
Figure 5:
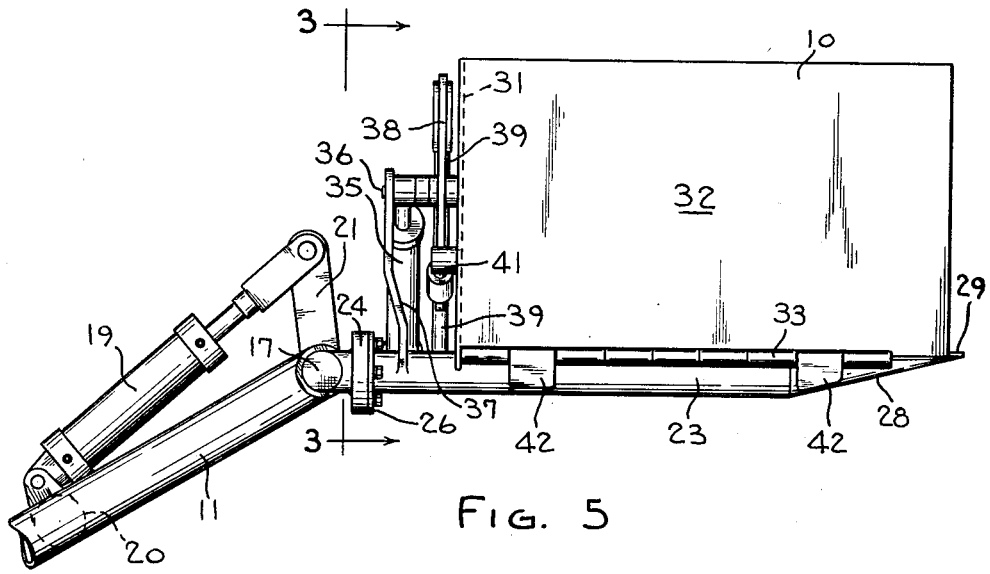
Fig. 5 is a side view of the bucket.

The arrangement is such that when the jack 35 is energized to extend the same, the bucket 10 is thereby tilted from the normal position shown in Fig. 3 into the dumping position of Fig. 4, and as a result of this movement, the lever 38 rocks from the Fig. 3 position into the Fig. 4 position, thereby actuating the linkage 41 in a manner to swing the side wall 32 into the open position shown in Fig. 4. It will be noted that in this open position the side wall 32 constitutes a continuation of the bottom of the bucket and thus functions as a chute to direct the discharged material a substantial distance laterally of the bucket.

Suitable means is preferably provided for limiting the opening movement of the side wall 32, so that it will normally assume the chute forming position just mentioned. For this purpose the hinge 33 is shown equipped with two stop lugs 42 arranged to swing with the side wall 32 and to engage the bottom of the bucket 10 when the side wall assumes the Fig. 4 position, and the linkage 41 preferably comprises a longitudinally resilient telescopic link of a well known type capable of yielding when this limiting position of the open side wall has been reached.

From the foregoing it will be noted that a tractor borne power shovel has been provided capable of side dumping the shoveled material without necessitating the repeated time-consuming turning movements of the tractor heretofore required.

Various changes may be made in the embodiment of the invention hereinabove described without departing from or sacrificing the advantages of the invention as defined in the appended claims.

I claim:

1. A power shovel for a tractor comprising a vertically swingable boom rockably mounted adjacent one end thereof on said tractor and extending longitudinally beyond said tractor so that its free end may be positioned adjacent the ground, a bucket support projecting forwardly from and mounted for vertical rocking movement on said boom about a pivot axis disposed transversely of and adjacent the free end of said boom, the rockable mount about such transverse pivot axis being so constructed that said bucket support can swing below said axis and make an angle with the boom substantially less than 180°, a material handling bucket supported by and on top of said bucket support and rockably mounted thereon about an axis of substantial length disposed longitudinally of said boom by means interposed between said bucket support and the underside of said bucket, said means fixedly holding said bucket support against forward tilting of said bucket with respect to said support but allowing only vertical lateral tilting of said bucket with respect to said bucket support whereby forward tilting of said bucket can only be effected by rocking said bucket support about said transverse pivot axis, said bucket being laterally tiltable about said longitudinal axis, a hingedly mounted side wall portion on said bucket, actuating means connected to said bucket support and operable to effect relative simultaneous movement of both said bucket and bucket support with respect to said boom and for holding said bucket support with said bucket selectively in digging, leveling or front-dumping position, actuating means connected to said bucket for tilting the same vertically laterally on said bucket support, and connecting means between said bucket support and said hingedly mounted side wall portion, said connecting means being responsive to relative movement between said bucket support and bucket for rocking said side wall portion into an open position.

2. A power shovel for a tractor comprising a vertically swingable boom rockably mounted adjacent one end thereof on said tractor and extending longitudinally beyond said tractor so that its free end may be positioned adjacent the ground, a bucket supporting member projecting forwardly from and rockably mounted on said boom for vertical movement about a substantially horizontal pivot axis disposed transversely of and adjacent the free end of said boom, the rockable mount about such transverse pivot axis being so constructed that said bucket supporting member can swing below said axis and make an angle with said boom substantially less than 180°, a bucket supported by and on top of said bucket supporting member and rockably mounted thereon about an axis of substantial length extending longitudinally of said boom by means interposed between said bucket supporting member and the underside of said bucket, said means fixedly holding said bucket on said bucket supporting member against forward tilting of said bucket with respect to said bucket supporting member but allowing only vertical lateral tilting of said bucket with respect to said bucket supporting member whereby forward tilting of said bucket can only be effected by rocking said bucket supporting member about said transverse pivot axis, said bucket being laterally tiltable on said bucket supporting member into a side-dumping position, a hingedly mounted side wall portion on said bucket, actuating means pivotally connected at one end thereof to said bucket supporting member to selectively position and retain said bucket supporting member with said bucket in digging, leveling or front-dumping position, actuating means connected to said bucket and operable to effect the lateral tilting and holding of said bucket in side-dumping position, and connecting means disposed between said bucket and said bucket supporting member and responsive to the tilting movement of said bucket on said bucket supporting member for rocking said hingedly mounted side wall portion to its open position wherein it forms a discharge chute for said bucket when the same is in side-dumping position.

3. A power shovel for a tractor comprising a vertically swingable boom rockably mounted adjacent one end thereof on said tractor and extending longitudinally beyond said tractor so that its free end may be positioned adjacent the ground, a bucket supporting frame projecting forwardly from and rockably mounted on said boom about a substantially horizontal pivot axis disposed transversely of and adjacent the free end of said boom, the rockable mount about such transverse pivot axis being so constructed that said bucket supporting frame can swing below said axis and make an angle with said boom substantially less than 180°, a bucket supported by and on top of said frame and rockably mounted thereon about an axis of substantial length extending longitudinally of said boom by means interposed between said frame and the underside of said bucket, said means fixedly holding said bucket on said frame against forward tilting of said bucket with respect to said frame but allowing only vertical lateral tilting of said bucket with respect to said frame whereby forward tilting of said bucket can only be effected by rocking said frame about said transverse pivot axis, actuating means connected to said frame and operable to effect simultaneous relative movement of both said bucket and said supporting frame with respect to said boom and for holding said supporting frame with said bucket selectively in digging, leveling or front-dumping position, and actuating means connected to said bucket for tilting the same on said frame about said longitudinally disposed axis for effecting movement of and holding said bucket in position for side dumping.

4. A power shovel for a tractor comprising a vertically swingable boom rockably mounted adjacent one end thereof on said tractor and extending longitudinally beyond said tractor so that its free end may be positioned adjacent the ground, a bucket supporting structure projecting forwardly from and rockably mounted on said boom for vertical movement about a substantially horizontal transverse pivot axis adjacent the free end of said boom, the rockable mount about such transverse pivot axis being so constructed that said bucket supporting structure can swing below said axis and make an angle with said boom substantially less than 180°, a bucket carried by and on top of said bucket supporting structure and laterally tiltable thereon about an axis of substantial length extending longitudinally of said boom by means interposed between said bucket supporting structure and the underside of said bucket, said means fixedly holding said bucket on said bucket supporting structure against forward tilting of said bucket with respect to said bucket supporting structure but allowing only vertical lateral tilting of said bucket with respect to said bucket supporting structure whereby forward tilting of said bucket can only be effected by rocking said bucket supporting structure about said transverse pivot axis, a side wall hingedly mounted on said bucket and movable with respect thereto to facilitate discharge of the contents of said bucket when in a side dumping position, actuating means pivotally connected at one end thereof to said bucket supporting structure and operable to effect simultaneous relative movement of both said bucket and said bucket supporting structure with respect to said boom and for holding said bucket supporting structure with said bucket selectively in digging, leveling or front-dumping position, and actuating means connected to said bucket for laterally tilting the same on said bucket supporting structure for effecting movement of and holding said bucket in position for side dumping.

5. A power shovel, as set forth in claim 3, in which said bucket supporting frame comprises laterally spaced elongated forwardly extending arms, and the longitudinal rocking axis supporting means is on one of said arms.

References Cited in the file of this patent

UNITED STATES PATENTS

| Number | Name | Date |
|---|---|---|
| 1,362,566 | Fulton et al. | Dec. 14, 1920 |
| 1,505,195 | Hansen | Aug. 19, 1924 |
| 1,921,917 | Flowers | Aug. 8, 1933 |
| 2,025,753 | Kuchar | Dec. 31, 1935 |
| 2,410,567 | Christiansen | Nov. 5, 1946 |
| 2,514,622 | Boulton | July 11, 1950 |
| 2,516,686 | Druschel | July 25, 1950 |
| 2,575,552 | Glenn, Jr. | Nov. 20, 1951 |
| 2,585,095 | Daniels | Feb. 12, 1952 |